United States Patent
Lemejda

(10) Patent No.: US 9,605,958 B2
(45) Date of Patent: Mar. 28, 2017

(54) METHOD AND DEVICE FOR DETERMINING THE INCLINED POSITION OF A VEHICLE

(75) Inventor: Markus Lemejda, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 735 days.

(21) Appl. No.: 14/001,350

(22) PCT Filed: Feb. 15, 2012

(86) PCT No.: PCT/EP2012/052615
§ 371 (c)(1),
(2), (4) Date: Nov. 5, 2013

(87) PCT Pub. No.: WO2012/113691
PCT Pub. Date: Aug. 30, 2012

(65) Prior Publication Data
US 2014/0046623 A1    Feb. 13, 2014

(30) Foreign Application Priority Data
Feb. 23, 2011    (DE) .................... 10 2011 004 587

(51) Int. Cl.
| | | |
|---|---|---|
| *G06F 19/00* | (2011.01) | |
| *G01C 9/00* | (2006.01) | |
| *B60W 40/12* | (2012.01) | |
| *B60W 30/04* | (2006.01) | |
| *B60W 50/00* | (2006.01) | |

(52) U.S. Cl.
CPC .............. *G01C 9/00* (2013.01); *B60W 40/12* (2013.01); *B60W 2030/043* (2013.01); *B60W 2050/0028* (2013.01); *B60W 2420/90* (2013.01); *B60W 2520/10* (2013.01); *B60W 2520/16* (2013.01)

(58) Field of Classification Search
CPC ....... G05D 1/0891; B62K 3/007; A63C 17/01; B62D 37/00
USPC ................................. 702/145, 150, 182–185
See application file for complete search history.

(56) References Cited

U.S. PATENT DOCUMENTS

| | | | |
|---|---|---|---|
| 6,121,873 A | 9/2000 | Yamada et al. | |
| 8,783,390 B2 * | 7/2014 | Maeda | B60G 7/008 180/242 |
| 2005/0121866 A1 * | 6/2005 | Kamen | A63C 17/01 280/47.18 |
| 2005/0216146 A1 | 9/2005 | Bauer et al. | |
| 2005/0216154 A1 | 9/2005 | Lehmann et al. | |
| 2006/0041367 A1 | 2/2006 | Ono et al. | |

FOREIGN PATENT DOCUMENTS

| | | |
|---|---|---|
| AT | 505 363 | 12/2008 |
| CN | 101208590 A | 6/2008 |
| DE | 10 2005 012458 | 11/2005 |
| DE | 10 2005 012456 | 1/2006 |
| DE | 10 2006 018978 | 11/2007 |
| JP | 4143776 B2 | 9/2008 |

\* cited by examiner

*Primary Examiner* — Edward Raymond
(74) *Attorney, Agent, or Firm* — Gerard Messina

(57) ABSTRACT

A method for determining the inclined position, includes using a sensor, whose measuring axis is inclined by a pitch angle with respect to the longitudinal axis of the vehicle, a rate of rotation having a roll rate component and a yaw rate component is measured. Ultimately, a roll angle for describing the inclined position of the vehicle is ascertained from the rate of rotation.

12 Claims, 1 Drawing Sheet

METHOD AND DEVICE FOR DETERMINING THE INCLINED POSITION OF A VEHICLE

FIELD OF THE INVENTION

The present invention relates to a method for determining the inclined position of a vehicle, in particular, of a motor vehicle, as well as to a device for executing the method.

BACKGROUND INFORMATION

The inclined position of a vehicle is described, as a rule, by roll angle φ. It is known, from the related art, that roll rate W of the vehicle can initially be measured with the aid of a roll rate sensor, and that roll angle φ can be determined by subsequently integrating the roll rate. However, the value determined in this manner only represents an amount Δφ, by which the roll angle has changed during the integration phase. On the other hand, initial value φ₀ at the beginning of the integration (offset) is not known. Thus, calculated roll angle φ includes an offset error. In addition, since changes in the roll angle are added to the current value, all of the occurring errors add up. Consequently, the roll rate is not stable over the long term. Therefore, a useful determination of roll angle φ according to common methods requires a further method for determining the roll angle, e.g., a model-based approach using the yaw rate and the longitudinal vehicle speed, in order to consequently compensate for the offset error.

Normally, both a roll rate sensor and a yaw rate sensor are used for determining roll angle φ. Roll angle φ is then determined, on one hand, according to the above-mentioned integration methods, and calculated, on the other hand, in a model-based manner, in view of the yaw rate. However, the two methods for determining roll angle φ have certain limitations to their accuracy. Therefore, the roll angle φ ultimately used by a vehicle system is ascertained by combining the two methods. This method for determining roll angle φ requires two rotation rate sensors and is, therefore, relatively expensive.

SUMMARY OF THE INVENTION

Thus, an object of the present invention is to provide a method and a device, by which the determination of the inclined position of a vehicle may be carried out in a simpler manner.

This object of the present invention may be achieved by the features described herein. Further embodiments of the present invention are the subject matter of the further descriptions herein.

According to the present invention, a rotation rate co, which includes a roll rate component and a yaw rate component, is measured by a rotation rate sensor, whose measuring axis is inclined by a pitch angle β with respect to the longitudinal axis of the vehicle. Roll angle φ is ultimately calculated from the rotation rate signal. This has the advantage that only a single rotation rate sensor is necessary, and that the determination of roll angle φ may be carried out simply and inexpensively.

The measuring axis of the sensor may lie in an xz plane of the vehicle coordinate system, the x direction being determined by the longitudinal axis and the z direction being determined by the vertical axis of the vehicle. Thus, the sensor measures both a roll rate component and a yaw rate component, but not a pitch rate component.

In this case, measuring signal ω of the rotation rate sensor is a mixed signal made up of roll rate W and yaw rate G and may be expressed as follows:

$$\omega = W\cos(\beta) - G\sin(\beta) \qquad (1)$$

The above-mentioned pitch angle β is an angle about the transverse axis of the vehicle and lies, therefore, in an xz plane of the vehicle coordinate system, as well.

According to the present invention, the measuring axis may not lie exactly in the direction of the longitudinal axis (x axis) or the vertical axis (z axis) of the vehicle. In other words, angle β may not be exactly +/−0, +/− 90 or +/− 180°.

It is not necessary for the measuring axis of the sensor to intersect the longitudinal axis of the vehicle. Thus, the sensor may also be situated laterally from the longitudinal axis.

Within the scope of the roll rate determination, yaw rate G of the vehicle may be calculated using a yaw rate model, which includes a dependence on roll angle φ. Yaw rate G is therefore calculated from other sensor signals, based on a model, and is not directly measured by a yaw rate sensor. In this manner, the yaw rate component of measured rotation rate ω (equation (1)) may be estimated, and it is possible to deduce the roll rate component in measured rate of rotation ω. The roll rate may ultimately be used for determining the roll angle.

A particularly simple specific embodiment of a yaw rate model ascertains yaw rate G as a function of longitudinal speed v and transverse acceleration ay of the vehicle. For example, the following model may be used for this:

$$G = (a_y - g\sin(\phi))/v \qquad (2)$$

where g represents the acceleration due to gravity.

Transverse acceleration ay and longitudinal speed v may be measured by sensors in a known manner or ascertained in another way.

In particular, in the case of a two-wheeled vehicle, transverse acceleration ay is usually small, and in most driving situations, it may be set to the value of zero as an approximation. In this case, only longitudinal speed v has to be ascertained. However, by taking the transverse acceleration into account, the accuracy of the method may be improved.

If the yaw rate of equation (2) is now inserted into equation (1), roll rate W may be solved for. The roll angle may ultimately be determined by integrating the roll rate with respect to the time.

According to a specific embodiment of the present invention, the roll rate is calculated in an iterative process, where an initial value for roll angle φ is first specified, and roll angle φ is then continually ascertained anew in an iterative process. In the iterative determination of roll angle φ, in each iteration step, roll angle $\phi_n$ of the previous iteration step is used as a starting point for determining the new value $\phi_{n+1}$.

A simple option for iteratively determining roll angle φ is to add the integral of roll rate W with respect to time to the value of roll angle $\phi_n$ from an iteration step n, where roll rate $W(\phi_n)$ is a function of $\phi_n$. The new value of roll angle $\phi_{n+1}$ is obtained, e.g., from the equation:

$$\phi_{n+1} = \phi_n + \int W(\phi_n)dt \qquad (3)$$

The dependence of roll rate W on roll angle $W(\phi_n)$ ensures that an offset error asymptotically decays with each iteration step. This is achieved in that roll angle $\phi_n$ is functionally dependent on roll rate $W(\phi_n)$, and in that in the expression $\int W(\phi_n)dt$, at least one term dependent on the roll angle enters into the integration with an opposite algebraic sign. Consequently, the roll angle φ calculated in this manner is considerably more accurate and stable over the long term.

In addition, information about the roadway may be taken into account in the determination of roll angle φ. The information about the roadway may be, for example, the inclination of the road surface or another piece of information that has an influence on the computational result. The inclination of the roadway may be measured or estimated in a known manner. The calculation of the roll angle may be corrected with the aid of this information. The same applies to the pitch angle and the pitch rate of the vehicle, which may be used to determine the roll angle more accurately.

The method of the present invention may be implemented, for example, on a two-wheeled vehicle such as a motorcycle.

A system, which is set up in accordance with the present invention and is for implementing the method, includes a processing unit, such as a control unit, which, apart from all of the further variables entering into the calculation, receives a signal from a rotation rate sensor, whose measuring axis is inclined by a pitch angle β with respect to the longitudinal axis of the vehicle, which means that the sensor signal has a roll rate component and a yaw rate component. With the aid of a computational algorithm, roll angle φ is ultimately calculated from the rotation rate signal.

In the following, the present invention is explained in greater detail by way of example, with reference to the attached drawing.

DETAILED DESCRIPTION

Figure 1:
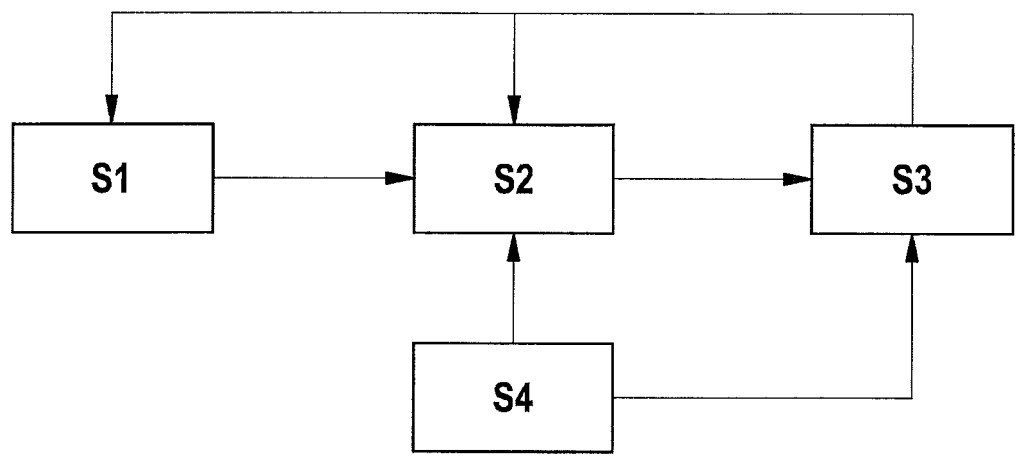
FIG. 1 shows a schematic block diagram of a specific embodiment of a method for determining the inclined position of a vehicle.

FIG. 1 shows a schematic block diagram of a specific embodiment of a method for determining the inclined position of a vehicle, such as a motorcycle, which is not shown in further detail.

Figure 2:
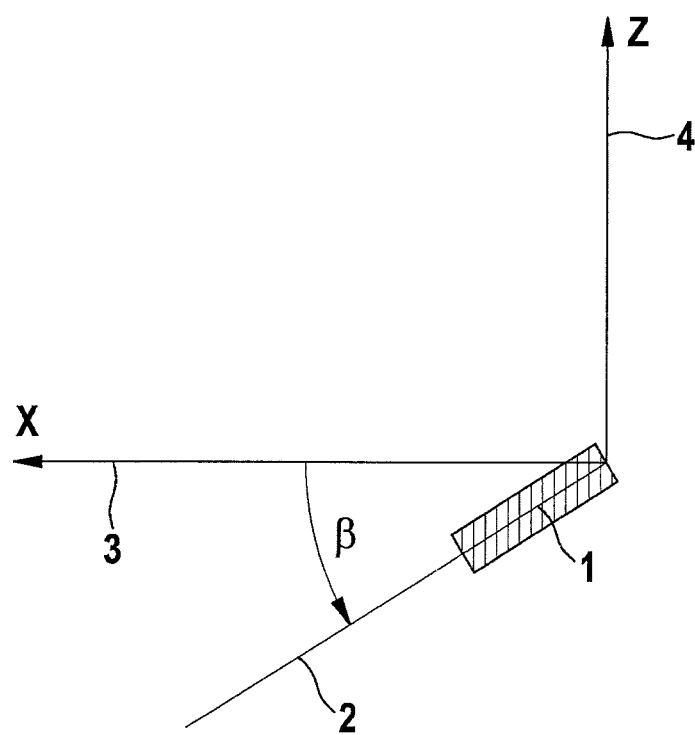
FIG. 2 shows a possible orientation of a sensor for measuring a rate of rotation having a roll-rate and a yaw-rate component.

In a first step S1, a rate of rotation ω is measured by a rotation rate sensor 1, as is shown in FIG. 2. Rotation rate sensor 1 may be, e.g., a piezoelectric or a micromechanical sensor.

Measuring axis 2 of sensor 1 lies in an xz plane of the vehicle coordinate system, x direction 3 being determined by the longitudinal axis and z direction 4 being determined by the vertical axis of the motorcycle. Thus, the sensor measures both a roll rate component and a yaw rate component, but not a pitch rate component. In the orientation shown, measuring signal ω of rotation rate sensor 1 is expressed by the formula:

$$\omega = W \cos(\beta) - G \sin\beta \tag{1}$$

where W is the roll rate W and G is the yaw rate G of the vehicle. In this case, angle β is the angle formed by measuring axis 2 and x axis 3. It is also situated in the xz plane of the vehicle coordinate system, and it may be approximately 45°. As an alternative, the measuring axis may also be situated in the opposite quadrant, at an angle of approximately 225°.

In step S2, yaw rate G of the vehicle is calculated using a yaw rate model, which includes a dependence on roll angle φ. For example, the following model may be used for this:

$$G = (ay - g \sin(\phi_n))/v \tag{2}$$

In this context, the variables ay and v are the transverse acceleration and the longitudinal speed of the vehicle. The variables mentioned may be measured by sensors in a known manner or determined in another way. In the case of a motorcycle, transverse acceleration ay is usually small, and in most driving situations, it may be set to the value of zero as an approximation. In this case, only longitudinal speed v has to be ascertained. In the first iteration step, an arbitrary initial value between −90° and 90°, which may be 0°, may be selected as angle $\phi_n$.

In a third step S3, the yaw rate G calculated from equation (2) on the basis of a model is inserted into equation (1), and roll rate W is solved for. The following equation results from this:

$$W = W(\varphi) = \frac{v \tan(\beta)(ay - g \sin(\varphi))}{v} + \omega/\cos(\beta) \tag{4}$$

Therefore, a roll rate is ascertained as a function of roll angle φ.

The roll angle may ultimately be calculated in an iterative process:

$$\phi_{n+1} = \phi_n + \int W(\phi_n) dt \tag{3}$$

When new roll angle $\phi_{n+1}$ is calculated in step S3, then the method returns to step S1, and a rate of rotation ω is measured, with the aid of which the next iteration step is carried out. However, the roll angle last calculated in step S3 is used in step S2 ($\phi_n = \phi_{n+1}$).

After several iteration steps, the roll angle is independent of initial value $\phi_0$. This is a consequence of the fact that W(φ) includes a negative term dependent on φ (see equation (4)). Consequently, the method is stable in the long term.

In addition to above-described steps S1 through S3, a further step S4 may also be executed. In step S4, the inclination of the roadway and/or the pitch angle and/or the pitch rate are ascertained. This may be accomplished, for example, using a position sensor, additional acceleration sensors and/or rotation rate sensors.

The above-mentioned variables may be taken into account in the calculation of the roll rate in step S2, or in the determination of the roll angle in step S3, and the roll angle may be correspondingly corrected. Therefore, the inclined position of the motorcycle may be determined more accurately.

What is claimed is:

1. A method for determining an inclined position of a vehicle, the method comprising:
   measuring, with the aid of a sensor, whose measuring axis is inclined by a fixed pitch angle with respect to a longitudinal axis of the vehicle, a rate of rotation of the vehicle, which has a roll rate component and a yaw rate component; and
   ascertaining a roll angle of the vehicle from the rate of rotation.

2. The method of claim 1, wherein the yaw rate of the vehicle is calculated, using a yaw rate model, and the roll rate is ascertained from the measured rate of rotation as a function of the calculated yaw rate.

3. The method of claim 2, wherein the yaw rate model includes a dependence on the longitudinal speed of the vehicle.

4. The method of claim 2, wherein the yaw rate model includes a dependence on the transverse acceleration of the vehicle.

5. The method of claim 1, wherein the rate of rotation about a measuring axis, which does not point in a direction of the longitudinal axis or the vertical axis of the vehicle, is measured.

6. The method of claim 1, wherein an initial value for the roll angle is selected, and the roll angle is ascertained in an iterative process.

7. The method of claim 1, wherein a piece of information regarding the position of the roadway and/or the pitch angle of the vehicle is considered in the determination of the roll angle.

8. The method of claim 7, wherein a piece of information regarding the position of at least one of the roadway and the pitch angle of the vehicle is ascertained from a signal of at least one of at least one acceleration sensor and at least one wheel speed sensor.

9. The method of claim 1, wherein a piece of information regarding the change in position of the roadway and/or in the pitch angle of the vehicle is considered in the determination of the roll angle.

10. The method of claim 9, wherein a piece of information regarding the change in at least one of the position of the roadway and the pitch angle of the vehicle is ascertained from a signal of at least one rotation rate sensor.

11. The method of claim 1, wherein it is used for determining the inclined position of a two-wheeled vehicle.

12. A processing unit for determining an inclined position of a vehicle, comprising:
- a measuring arrangement to measure, with the aid of a sensor, whose measuring axis is inclined by a fixed pitch angle with respect to a longitudinal axis of the vehicle, a rate of rotation of the vehicle, which has a roll rate component and a yaw rate component; and
- an ascertaining arrangement to ascertain a roll angle of the vehicle from the rate of rotation.

* * * * *